United States Patent
Ukil et al.

(10) Patent No.: US 9,443,130 B2
(45) Date of Patent: Sep. 13, 2016

(54) METHOD, APPARATUS AND COMPUTER PROGRAM PRODUCT FOR OBJECT DETECTION AND SEGMENTATION

(71) Applicant: Nokia Technologies Oy, Espoo (FI)

(72) Inventors: Soumik Ukil, Bangalore (IN); Veldandi Muninder, Bangalore (IN); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/333,857

(22) Filed: Jul. 17, 2014

(65) Prior Publication Data

US 2015/0078669 A1    Mar. 19, 2015

(30) Foreign Application Priority Data

Aug. 19, 2013   (IN) .......................... 3658/CHE/2013

(51) Int. Cl.

| | |
|---|---|
| *G06K 9/00* | (2006.01) |
| *G06K 9/46* | (2006.01) |
| *G06K 9/34* | (2006.01) |
| *G06T 7/00* | (2006.01) |
| *G06K 9/66* | (2006.01) |

(52) U.S. Cl.
CPC ....... *G06K 9/00208* (2013.01); *G06K 9/00234* (2013.01); *G06K 9/66* (2013.01); *G06T 7/0075* (2013.01)

(58) Field of Classification Search
USPC ......................................... 382/154, 73, 201
See application file for complete search history.

(56) References Cited

U.S. PATENT DOCUMENTS

| | | | | |
|---|---|---|---|---|
| 6,671,399 | B1 * | 12/2003 | Berestov ............... | G06T 7/0075 345/419 |
| 6,754,389 | B1 * | 6/2004 | Dimitrova ......... | G06F 17/30256 348/169 |
| 6,862,364 | B1 * | 3/2005 | Berestov ................ | G06T 5/008 345/426 |
| 8,085,994 | B2 | 12/2011 | Kim | |

(Continued)

OTHER PUBLICATIONS

Kosov et al., "Rapid Stereo-Vision Enhanced Face Detection", 16th IEEE International Conference on Image Processing, Nov. 7-10, 2009, 4 Pages.

(Continued)

*Primary Examiner* — Kathleen Y Dulaney
(74) *Attorney, Agent, or Firm* — Alston & Bird LLP

(57) ABSTRACT

In an example embodiment, a method, apparatus and computer program product are provided. The method includes facilitating receipt of a first image and a second image of a scene comprising one or more objects. The method includes detecting the objects in the first image by detecting object point of the objects in the first image. The method includes detecting the object points of the objects in the second image based on detection of the object points of the objects in the first image. Detection of an object point in the second image that corresponds to an object point of the first image comprises searching for the object point on an epipolar line in the second image corresponding to the object point of the first image. The method includes determining disparity values between the objects points in the first image and the object points in the second image.

18 Claims, 6 Drawing Sheets

(56) References Cited

U.S. PATENT DOCUMENTS

| | | | |
|---|---|---|---|
| 8,411,932 B2* | 4/2013 | Liu | H04N 13/0022 345/422 |
| 8,861,881 B2* | 10/2014 | Tate | G06T 5/003 345/473 |
| 2002/0061131 A1* | 5/2002 | Sawhney | G06T 7/0022 382/154 |
| 2003/0006984 A1* | 1/2003 | Gerard | G06T 7/0083 345/424 |
| 2004/0109585 A1* | 6/2004 | Tao | G06T 7/0071 382/106 |
| 2004/0240725 A1* | 12/2004 | Xu | G06K 9/32 382/154 |
| 2007/0031037 A1* | 2/2007 | Blake | G06K 9/00234 382/173 |
| 2007/0109300 A1* | 5/2007 | Li | G06T 7/0022 345/427 |
| 2007/0159640 A1* | 7/2007 | Berestov | H04N 13/0239 356/611 |
| 2009/0003687 A1* | 1/2009 | Agarwal | G06T 7/0024 382/154 |
| 2010/0158387 A1 | 6/2010 | Choi et al. | |
| 2010/0259597 A1* | 10/2010 | Choi | G06K 9/00255 348/46 |
| 2010/0309292 A1* | 12/2010 | Ho | H04N 13/026 348/47 |
| 2012/0183202 A1* | 7/2012 | Wei | H04N 13/026 382/154 |
| 2012/0242803 A1* | 9/2012 | Tsuda | H04N 13/0022 348/46 |
| 2012/0293667 A1* | 11/2012 | Baba | H04N 13/0246 348/187 |
| 2013/0127824 A1* | 5/2013 | Cohen | G06T 7/0083 345/419 |
| 2013/0129194 A1* | 5/2013 | Gusis | G06T 5/50 382/154 |
| 2013/0236089 A1* | 9/2013 | Litvak | G06K 9/00382 382/154 |
| 2014/0369584 A1* | 12/2014 | Fan | A61B 6/501 382/131 |

OTHER PUBLICATIONS

Boykov et al., "Fast Approximate Energy Minimization Via Graph Cuts", IEEE Transactions on Pattern Analysis and Machine Intelligence, vol. 23, No. 11, Nov. 2001, pp. 1222-1239.

Wu et al., "A Novel Approach for Face Recognition Based on Stereo Image Processing Algorithm", International Conference on Audio, Language and Image Processing, Jul. 7-9, 2008, pp. 1245-1249.

Aissaoui et al., "3D Face Reconstruction in a Binocular Passive Stereoscopic System Using Face Properties", 19th IEEE International Conference on Image Processing, Sep. 30-Oct. 3, 2012, 4 Pages.

International Search Report and Written Opinion received for corresponding Patent Cooperation Treaty Application No. PCT/FI2014/050541, dated Oct. 15, 2014, 14 pages.

Sadykhov, et al., "Algorithm for real time faces detection in 3D space", Proceedings of the International Multiconference on Computer Science and Information Technology, IMCSIT, vol. 3, 2008 Figs. 1-4, pp. 2-4.

Houben Q., et al. "Multi-feature Stereo Vision System for Road Traffic Analysis", Proceedings of the Fourth International Conference on Computer Vision Theory and Applications, Lisboa, Portugal, Feb. 5-8, 2009—vol. 2, pp. 554-559, abstract, chapters 2, 3, 5, Fig 4

Gu D., et al, "Human Segmentation Based on Disparity map and GrabCut", Computer Vision in Remote Sensing (CVRS), 2012, pp. 67-71.

\* cited by examiner

METHOD, APPARATUS AND COMPUTER PROGRAM PRODUCT FOR OBJECT DETECTION AND SEGMENTATION

TECHNICAL FIELD

Various implementations relate generally to method, apparatus, and computer program product for object detection and segmentation in images.

BACKGROUND

Various electronic devices such as cameras, mobile phones, and other devices are now used for capturing two or more images of a scene. Such capture of the images, for example, stereoscopic images may be used for detection of objects and post processing applications. Some post processing applications include disparity/depth estimation of the objects and segmentation of the objects in the captured images. Although, electronic devices are capable of supporting applications that detect the objects in the stereoscopic images; however, such object detection and post processing applications such as disparity estimation and object segmentation involve intensive computations.

SUMMARY OF SOME EMBODIMENTS

Various aspects of example embodiments are set out in the claims.

In a first aspect, there is provided a method comprising: facilitating receipt of a first image and a second image of a scene comprising one or more objects; detecting the one or more objects in the first image, wherein detecting the one or more objects comprises detecting object point of the one or more objects in the first image; detecting the object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image; and determining disparity values between the objects points of the one or more objects in the first image and the objects points of the one or more objects in the second image, wherein a disparity value between the object point in the first image and the object point in the second image is determined based at least on a detected position of the object point in the first image and a detected position of the object point in the second image.

In a second aspect, there is provided an apparatus comprising at least one processor; and at least one memory comprising computer program code, the at least one memory and the computer program code configured to, with the at least one processor, cause the apparatus to perform at least: facilitate receipt of a first image and a second image of a scene comprising one or more objects;

detect the one or more objects in the first image, wherein detecting the one or more objects comprises detecting object point of the one or more objects in the first image; detect the object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image; and determine disparity values between the objects points of the one or more objects in the first image and the objects points of the one or more objects in the second image, wherein a disparity value between the object point in the first image and the object point in the second image is determined based at least on a detected position of the object point in the first image and a detected position of the object point in the second image.

In a third aspect, there is provided a computer program product comprising at least one computer-readable storage medium, the computer-readable storage medium comprising a set of instructions, which, when executed by one or more processors, cause an apparatus to perform at least: facilitate receipt of a first image and a second image of a scene comprising one or more objects; detect the one or more objects in the first image, wherein detecting the one or more objects comprises detecting object point of the one or more objects in the first image; detect the object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image; and determine disparity values between the objects points of the one or more objects in the first image and the objects points of the one or more objects in the second image, wherein a disparity value between the object point in the first image and the object point in the second image is determined based at least on a detected position of the object point in the first image and a detected position of the object point in the second image.

In a fourth aspect, there is provided an apparatus comprising: means for facilitating receipt of a first image and a second image of a scene comprising one or more objects; means for detecting the one or more objects in the first image, wherein detecting the one or more objects comprises detecting object point of the one or more objects in the first image; means for detecting the object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image; and means for determining disparity values between the objects points of the one or more objects in the first image and the objects points of the one or more objects in the second image, wherein a disparity value between the object point in the first image and the object point in the second image is determined based at least on a detected position of the object point in the first image and a detected position of the object point in the second image.

In a fifth aspect, there is provided a computer program comprising program instructions which when executed by an apparatus, cause the apparatus to: facilitate receipt of a first image and a second image of a scene comprising one or more objects; detect the one or more objects in the first image, wherein detecting the one or more objects comprises detecting object point of the one or more objects in the first image; detect the object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image; and determine disparity values between the objects points of the one or more objects in the first image and the object points of the one or more object points the second image, wherein a disparity value between the object point in the first image and the object point in the second image is determined based at least on a detected position of the object point in the first image and a detected position of the object point in the second image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6 of the drawings.

Figure 1:
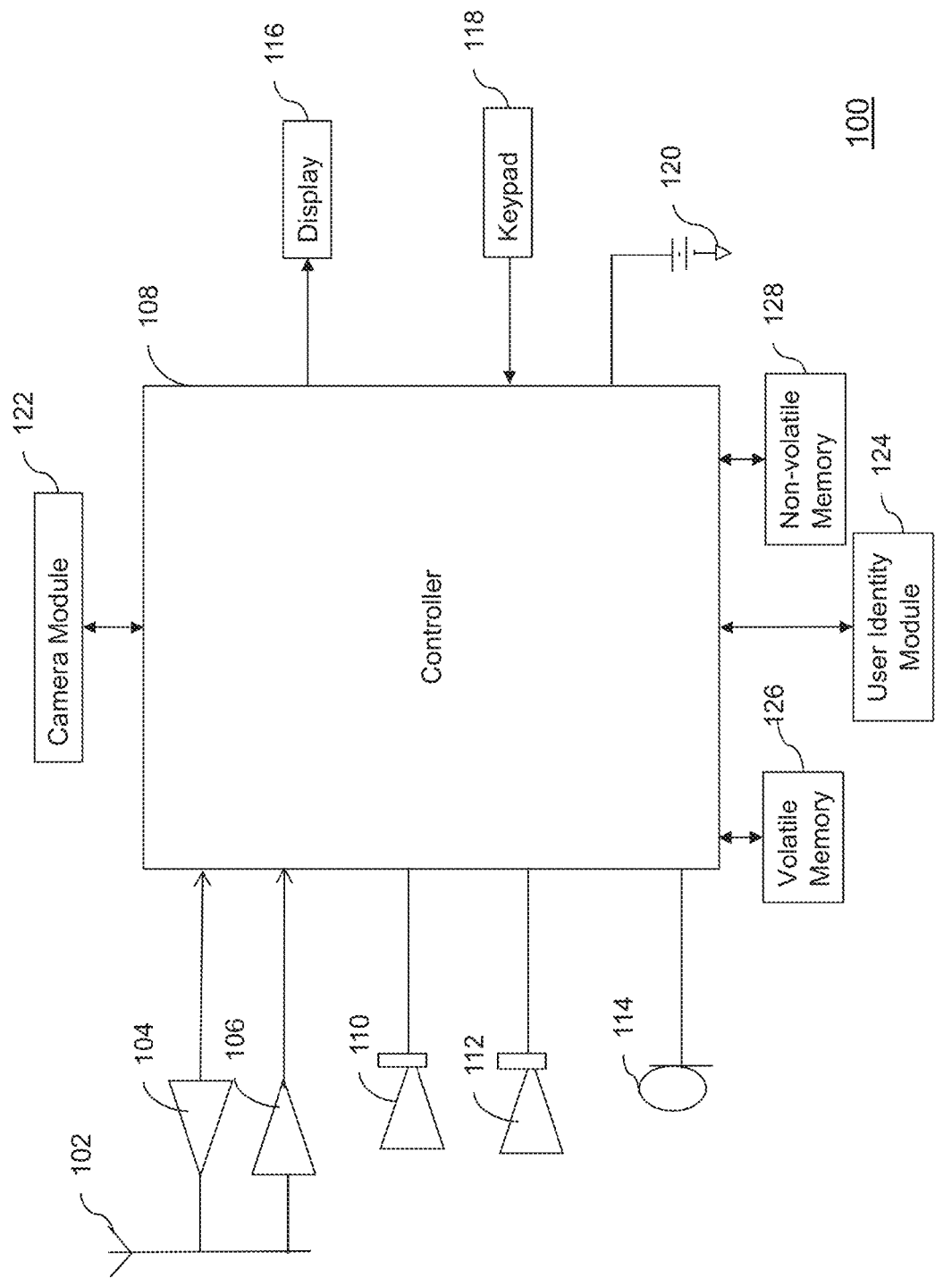
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media-capturing element, such as a camera, video and/or audio module, in communication with the controller 108. The media-capturing element may be any means for capturing an image, video and/or audio for storage, display or transmission. In an example embodiment in which the media-capturing element is a camera module 122, the camera module 122 may include a digital camera (or array of multiple cameras) capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100. Practically, the camera module(s) can also be on anyside, but normally on the opposite side of the display 116 or on the same side of the display 116 (for example, video call cameras).

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
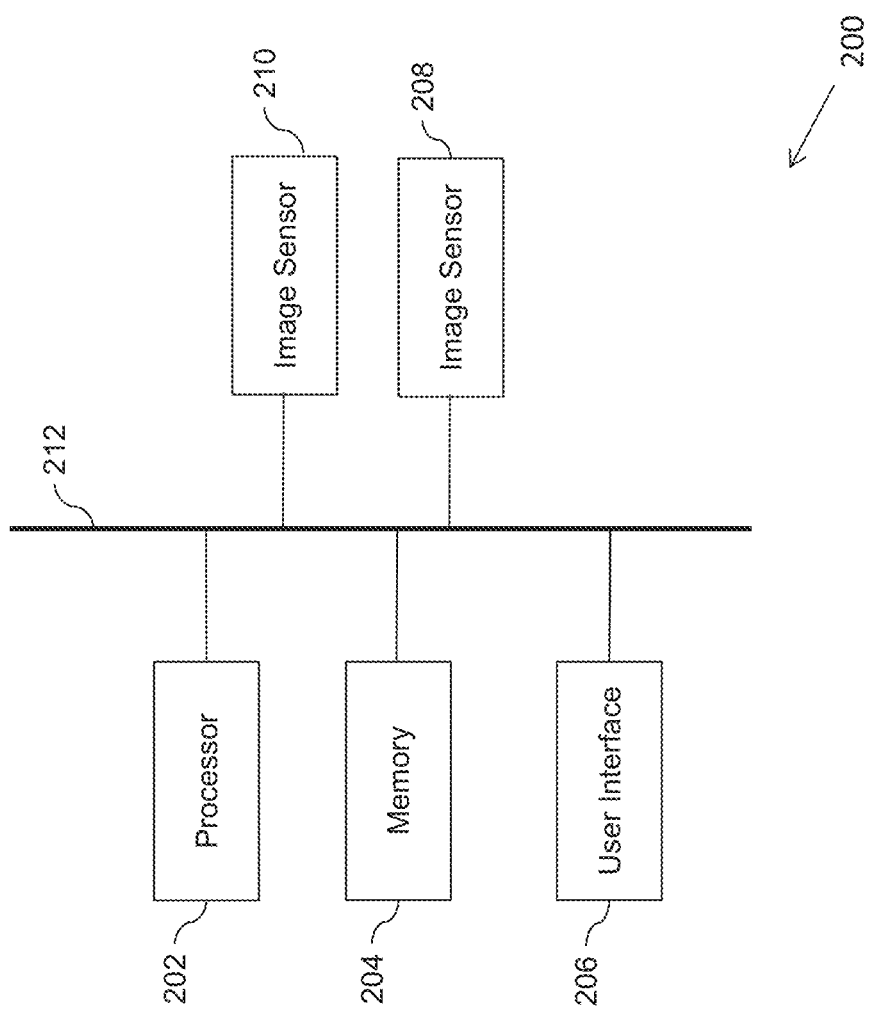
FIG. 2 illustrates an example block diagram of an apparatus, in accordance with an example embodiment.

FIG. 2 illustrates an apparatus 200 for detecting and segmenting objects in images of a scene, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. Some examples of electronic device may include a camera. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic device may be embodied as to include at least one image sensor, such as an image sensor 208 and image sensor 210. Though only two image sensors 208 and 210 are shown in the example representation of FIG. 2, but the electronic device may include more than two image sensors or only one image sensor. The image sensors 208 and 210 may be in communication with the processor 202 and/or other components of the apparatus 200. The image sensors 208 and 210 may be in communication with other imaging circuitries and/or software, and are configured to capture digital images or to capture video or other graphic media. The image sensors 208 and 210 and other circuitries, in combination, may be example of at least one camera module such as the camera module 122 of the device 100. The image sensors 208 and 210, alongwith other components may also be configured to capture a plurality of images depicting a scene from different positions (or different angles). In an example embodiment, the image sensors 208 and 210 may be accompanied with corresponding lenses to capture two views of the scene, such as stereoscopic views. In an alternate embodiment, there may be a single camera module having an image sensor used to capture a first image of the scene from a position (x), and then move through a distance (e.g., 10 meters) to another position (y) and capture a second image of the scene.

These components (202-210) may communicate to each other via a centralized circuit system 212 to perform detection and segmentation of objects in multiple images of the scene. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of a first image and a second image. In an embodiment, the first image and the second image comprise slightly different views of a scene comprising one or more objects. In an example embodiment, the first image and the second image of the scene are captured such that there in a disparity in at least one object of the scene between the first image and the second image. In an example embodiment, the first image and the second image are stereoscopic pair of images. For example, a stereo camera captures the first image and the second image, such that, the first image includes a slight parallax with the second image representing the same scene. In some other example embodiments, the first image and the second image may also be received from a camera capable of capturing multiple views of the scene, for example, a multi-baseline camera, an array camera, a plenoptic camera and a light field camera. In some example embodiments, the first image and the second image may be prerecorded or stored in an apparatus 200, or may be received from sources external to the apparatus 200. In such example embodiments, the apparatus 200 is caused to receive the first image and the second image from external storage medium such as DVD, Compact Disk (CD), flash drive, memory card, or from external storage locations through Internet, Bluetooth®, and the like. In an example embodiment, a processing means may be configured to facilitate receipt of the first image and the second image of the scene comprising the one or more objects, where there in a disparity in at least one object of the scene between the first image and the second image. An example of the processing means may include the processor 202, which may be an example of the controller 108, and/or the image sensors 208 and 210.

In an example embodiment, the first image and the second image received by the apparatus 200 may be rectified stereoscopic pair of images with respect to each other. In embodiments, in which, the first image and the second image received or accessed by the apparatus 200 are not rectified images, these images are rectified for further processing. In such example embodiments, the processor 202 is configured to, with the content of the memory 204, and optionally with other components described herein, to cause the apparatus 200 to rectify the first image with respect to the second image such that a row (for example, a horizontal line) in the first image corresponds to a row (for example, a horizontal line) in the second image. For instance, if the first image and the second image are image captures of the scene with slightly different views, the first image and the second image are rectified by changing the orientation of the first image relative to the second image, such that, a horizontal line passing through a point in the first image corresponds to the epipolar line associated with the point in the second image. In an example, due to epipolar constraints in the stereoscopic images, every pixel point of objects (also referred to as 'object point') in one image, for example, in the first image has a corresponding epipolar line in the other image, for example, the second image. For example, due to the epipolar constraints, for a pixel point of the first image, a corresponding pixel point may be present at an epipolar line in the second image, where the epipolar line is a corresponding epipolar line for the pixel point of the first image. In an example embodiment, a processing means may be configured to rectify the first image relative to the second image such that a horizontal line in the first image corresponds to a horizontal line in the second image. An example of the processing means may include the processor 202, which may be an example of the controller 108.

In an example embodiment, the apparatus 200 is caused to detect the one or more objects in the first image. For instance, the first image may contain an object, such as a butterfly, and object points of the butterfly are detected by the apparatus 200. In an example, the apparatus 200 is configured to detect the butterfly and the location of the butterfly using suitable object detection techniques known in the art. In an example embodiment, a processing means may be configured to detect object points of the one or more objects in the first image. An example of the processing means may include the processor 202, which may be an example of the controller 108. In an example embodiment, the object points of any object are detected in a sparse manner, for example, only few object points of the objects are detected.

In an example embodiment, the processor 202 is configured to, with the content of the memory 204, and optionally with other components described herein, to cause the apparatus 200 to detect the object points of the one or more objects in the second image based on the detection of the object point of the one or more objects in the first image. For instance, for every object detected in the first image, a corresponding object is detected in the second image. In an example embodiment, detecting a corresponding point of an object in the second image that corresponds to a point of the object (also referred to as "object point") detected in the first image comprises searching for the object point in the second image on an epipolar line in the second image. In an example, the epipolar line in the second image is a corresponding epipolar line for the object point of the first image. For instance, there may be an epipolar line in the second image for every object point in the first image; and detecting the object point in the second image that corresponds to the object point in the first image includes searching the object point along the corresponding epipolar line (corresponds to the object point in the first image) in the second image. In an example embodiment, a processing means may be configured to detect the object point of one or more objects in the second image based on the detection of the object points of the one or more objects in the first image. An example of the processing means may include the processor 202, which may be an example of the controller 108.

In an example embodiment, the processor 202 is configured to, with the content of the memory 204, and optionally with other components described herein, to determine search ranges for the object points of the one or more objects of the first image, in the second image along corresponding epipolar lines of the object points. In an example, the search ranges includes epipolar lines in the second image where the epipolar lines correspond to the object points associated with the objects detected in the first image. In an example embodiment, a search range for an object point of a first object of the one or more objects is more than a search range for an object point of a second object of the one or more objects. In an example, the object with the largest size (or that is closest to a camera capturing the first and second image) is associated with a search region that is the largest, and the search ranges for the objects with sizes lesser than the largest size (or that are far from the camera) decreases accordingly. In an example embodiment, a processing means may be configured to determine the search ranges for the object points of the one or more objects of the first image in the second image. An example of the processing means may include the processor 202, which may be an example of the controller 108.

In an example embodiment, the processor 202 is configured to, with the content of the memory 204, and optionally with other components described herein, to cause the apparatus 200 to determine disparity values between object points of the one or more objects in the first image and the object points of the one or more objects in the second image. In some example, an object may have a single disparity between the first image and the second image. However, in an object for example a face, a nose tip of the face may have a different disparity than ear of the face. In an example embodiment, a disparity value for an object point between the first image and the second image is determined based at least on a detected position of the object point in the first image and a detected position of the object point in the second image. For example, a difference in the locations of the object point in the first image and the second image may be a disparity of the object point between the first image and the second image. In an example embodiment, a processing means may be configured to determine one or more disparity values between the object points of the one or more objects in the first image and the object points of the one or more objects in the second image, wherein a disparity value for an object point between the first image and the second image is determined based at least on a detected position of the object point in the first image and a detected position of the object point in the second image. An example of the processing means may include the processor 202, which may be an example of the controller 108.

In an example embodiment, the processor 202 is configured to, with the content of the memory 204, and optionally with other components described herein, to cause the apparatus 200 to segment an (or more) object of the one or more objects in at least one image of the first image and the second image based on the at least one disparity value associated with object points of the object. For instance, an object may be segmented from the other objects detected in an image (the first image or the second image) based on the disparity values associated with the object and a technique including but not limited to, a graph cut method. In an example embodiment, for the segmentation of the object from the image (the first image or the second image), the apparatus 200 is caused to assign an object label to the object points of the object and assign a non-object label to the remaining pixel points of the image, and the apparatus 200 is further caused to segment a portion corresponding to the assigned object label using suitable techniques such as graph cut method. For instance, the processor 202, with the content of the memory 204, and optionally with other components described herein, to cause the apparatus 200 to assign the object label for the object points associated with the object based on an object cost function between the first image and the second image. In an example embodiment, the object cost function is a degree of consistency of one or more image parameters between the first image and the second image. Examples of the image parameters include but are not limited to, color and texture of the first and second images. In an example embodiment, object cost functions are computed for object points of the object associated with a first range of disparity values, and a disparity value for which the object cost function is the least is assigned the object label for the object (for the object points of the object). In an example embodiment, the apparatus 200 is caused to assign a non-object label for the remaining pixel points of the image based on a non-object cost function between the first image and the second image. For example, points in the image other than the object points associated with the object are assigned with the non-object label. In an example, non-object cost functions are computed between pixel points in the first image and the second image, for a second range of disparity values (for example, different than the first range of disparity values used for the computation of the object cost). In an example, a minimum non-object cost function is selected from among the non-object cost functions and a disparity value associated with the minimum non-object cost function is assigned as the non-object label for the remaining pixel points of the image. In an example embodiment, the apparatus 200 is caused to segment the object based on applying the graph cut algorithm on the object label and the non-object label. In an example embodiment, a processing means may be configured to segment the object of the one or more objects in at least one image of the first image and the second image based on the at least one disparity value associated with object points of the object. An example of the processing means may include the processor 202, which may be an example of the controller 108.

Figure 3:
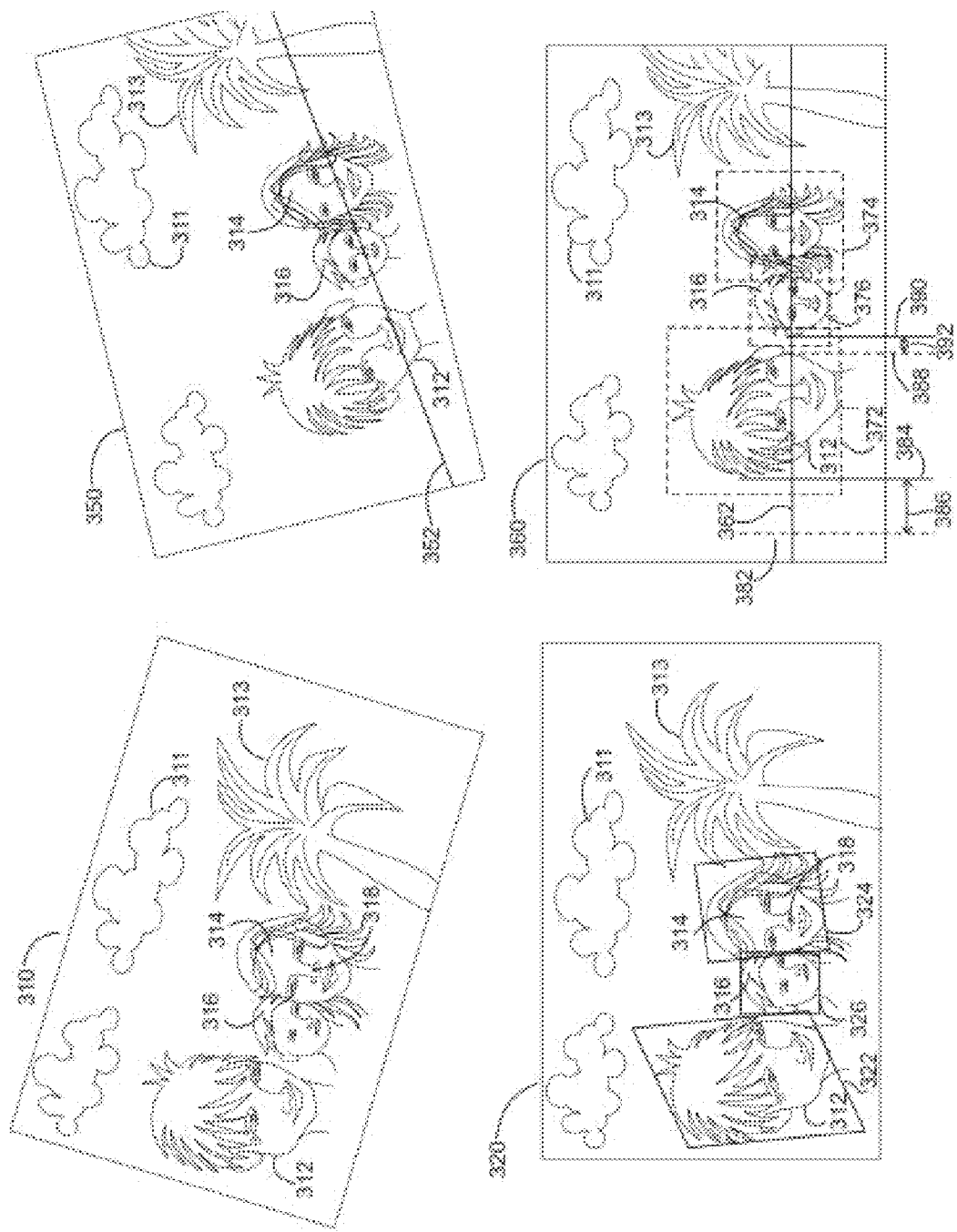
FIG. 3 illustrates an example representation of detection of objects in a pair of images, in accordance with an example embodiment.
Figure 4:
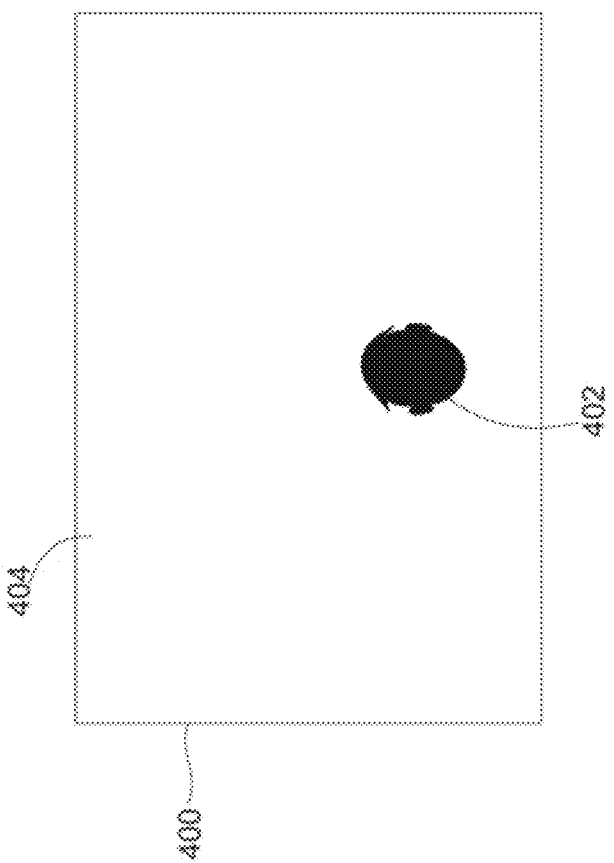
FIG. 4 illustrates an example representation of segmentation of an object from an image of the pair of images, in accordance with an example embodiment.

Some example embodiments of object detection and segmentation are further described with reference to FIGS. 3 and 4, and these FIGS. 3 and 4 represent one or more example embodiments only, and should not be considered limiting to the scope of the various example embodiments.

FIG. 3 illustrates an example representation of detection of objects in stereoscopic pair of images, in accordance with an example embodiment. In an example embodiment, a stereo camera may be used to capture the stereoscopic pair of images, such as a first image 310 and a second image 350 of a scene. An example of the scene may include any visible setup or arrangement of objects such that images of the scene can be captured by a media capturing module, such as the camera module 122 or the sensor such as the sensors 208 and 210, where the first image 310 slightly differs from the second image 350 in terms of position of objects of the scene as captured in the images 310 and 350. In an example embodiment, the first image 310 and the second image 350 may also be captured by a moving camera at two different time instants such that the first image 310 corresponds to a left eye image of the scene and the second image 350 corresponds to a right eye image of the scene. For example, the first image 310 is captured representing the scene and then the camera is moved through a pre-determined distance and/or angle to capture the second image 350 of the scene. In other examples, the images 310 and 350 may be captured by camera such as multi baseline cameras, array cameras, light-field camera and plenoptic cameras that are capable of capturing multiple views of the scene. In the FIG. 3, the first image 310 and the second image 350 show different views of the scene comprising objects, such as, a man 312, a woman 314, a child 316 and background depicted by cloud 311 and a tree 313. It should be noted that there may be disparity for the objects 312, 314, 316 and the background 311, 313 between the pair of stereoscopic images 310 and 350.

In an example, every object point (or pixel point) in the first image 310 may have a corresponding object point located at a corresponding epipolar line in the second image 350. In an example embodiment, a pixel point at a location (x,y) in the first image 310 may have a corresponding pixel point on an epipolar line in the second image 350 corresponding to the pixel point. For example, pixel point 318 (a pixel point depicting nose tip of the woman 314) may have a corresponding pixel point at an epipolar line 352 of the pixel point 318 in the image 350. Similarly, each pixel point in the image 310 may have a corresponding epipolar line in the image 350. In an example embodiment, the image 310 and the image 350 are rectified to generate images 320 and 360, respectively. In an embodiment, rectifying the images 310 and 350 comprises aligning the images 310 and 350, to generate the images 320 and 360, such that horizontal lines (pixel rows) of the image 320 correspond to horizontal lines (pixel rows) of the image 360. It should be noted that the process of rectification for the pair of images 310 and 350 (given the camera parameters, either through direct or weak calibration) transforms planes of the original pair of images 310 and 350 to different planes in the pair of images 320 and 360 such that the resulting epipolar lines are parallel and equal along new scan lines. As shown in FIG. 3, the images 310 and 350 are rectified by rotating/adjusting the images 310 and/or 350, such that, pixel rows of the image 320 correspond to pixel rows of the image 360.

In an example embodiment, the apparatus 200 is caused to detect one or more objects in the image 320. In an example, the image 320 may have at least one object, for instance, the image 320 depicting the scene includes objects, among other things, for example, the man 312, the woman 314, the child 316, and a background comprising the cloud 311 and the tree 313. In an example embodiment, the image

320 may be scanned horizontally (along each pixel row) in a sequential manner, to detect the location/color distribution of the objects 312, 314 and 316 in the image 320. It should be noted that suitable object (or face) detection techniques such as a skin color-based approach, a boosting approach, a support vector machine (SVM) approach, a gaussian mixture approach, a maximum likelihood approach, and a neural network approach may be used to detect objects in the image 320. As shown in the FIG. 3, detected faces 322, 324 and 326 correspond to face of the man 312, the woman 314 and the child 316, respectively.

In an example embodiment, the object points of the one or more objects are detected in the second image 360 based on the detection of the object points of the one or more objects, such as the objects 312, 314 and 316 in the first image 320. For instance, for every object detected in the first image 320, a corresponding object is detected in the second image 360 using the location of the object in the image 320. In an example embodiment, for the face 322 of the man 312 (the object) detected in the first image 312, similar object is searched and detected in the image 360 in a search range determined for the face 322. In an example, features may include matching some object points or all object points corresponding to the man 312 (object) detected in the first image 320 to the man 312 in the second image 360. Examples of matching features may include matching dimensions, color, texture and edges of pixels representing the man 312 in the image 320. Various example embodiments preclude searching the entire image 360 for searching any object already detected in the image 320; instead the search is performed in a search range determined based on the epipolar constraints. For example, for every detected face in the image 320, a face is searched at the same scale as in the image 360. For instance, in an example embodiment, the search for an object point of the face may be started in the image 360 from the same location of the object point of the face as in the image 320, and the image 360 is scanned along the same scanline (epipolar line corresponding to the object point). Accordingly, the complexity of face detection in the image 360 is drastically reduced by localizing the search range based on the knowledge of the location of the face in the image 320 (and thereby in the image 360) and the epipolar constraints.

In an example embodiment, search ranges for the objects 312, 314 and 316 in the image 360 are determined along the epipolar lines in the image 360 for the corresponding object points of the image 320. In an example, each pixel point, such as the pixel point 318 in the image 320 is associated with the epipolar line (see, 362) in the second image 360, and accordingly the pixel points 318 is searched on the epipolar line 362 in the image 360. Similarly, other pixel points of the image 320 may be searched along their corresponding epipolar lines. For example, pixel points corresponding to the face 326 of the child 316 of the image 320 may be searched at the corresponding epipolar lines of the pixel points in the second image 360 and the search range is restricted along the epipolar lines. As shown in FIG. 3, the search range 376 is determined that may comprise a plurality of epipolar lines corresponding to the pixel points of the face 326, and the search region 376 may define a probable region to detect the face 326 in the image 360. Similarly, plurality of epipolar lines in the search region 372 and 374 are determined in the image 360 for detecting the faces 322 and 324 in the image 360.

In some example embodiments, computation involved in the search along the epipolar lines in the image 360 may further be reduced by optimizing the search ranges in the image 360 based on the information of sizes (or distance from the camera capturing the images) of the objects as detected in the image 320. In an example embodiment, the apparatus 200 is caused to sort the one or more objects detected in the image 320 based on corresponding sizes of the one or more objects. For instance, size associated with each of the detected objects 322, 324 and 326 in the image 320 is determined as h1, h2 and h3, respectively. In an example embodiment, the objects are sorted in descending order based on their sizes. For example, if the sizes are such that, h1>h2>h3, the processor 202 is configured to sort the faces in an order such as 322, 324 and 326. In an example embodiment, a search range for the largest face may be calibrated for a particular stereo camera setup from the baseline, focal length and the face size.

In an example embodiment, the search range in the second image 360 decreases with decrease in the sizes of the objects detected in the image 320. Alternatively or additionally, a search range may be larger for an object that is near to the camera as compared to an object far from the camera. In an example embodiment, an object that is near to the camera may have a greater disparity between the images 320 and 360 as compared to another object far from the camera. In an example embodiment, based on the sizes and locations of the objects, the search ranges may be determined. For instance, as the size of the face 322 is larger than the face 324, and the face 324 is larger than the face 326, the objects in the decreasing order in the disparity may be the objects 322, 324 and 326. In an example embodiment, the search range 372 is greater than the search range 374, and the search range 374 is greater than the search range 376, based on the decreasing order of the disparity. Without loss of generality, for the largest face (for example, the face 322), the disparity and corresponding search range 372 is the largest. This search range 372 may be calibrated for a particular stereo camera setup from a baseline, a focal length and a size of the face 322. Further, the search range 374 may be estimated based on the search range 372, for example, slightly smaller than the search range 372. Furthermore, the search range 376 may be estimated based on the search range 374, for example, slightly smaller than the search range 374.

In an example embodiment, one or more disparity values associated with the one or more objects are determined. In an example embodiment, a disparity value for an object between the image 320 and the image 360 is determined based on a location of the object in the image 320 and a location of the object in the image 360. For example, if the man 312 was at a location 382 (shown by a dashed line 382 as representing virtual position of the man 312 in the image 360) in the image 320 and a location 384 in the image 360, disparity value 386 associated with the man 312 is determined as distance between the locations 382 and 384. Also shown in FIG. 3, a disparity 392 of the child 316 is determined as difference between a position 388 (shown by a dashed line as representing virtual position of the child 316 in the image 320) and a position 390 associated with location of the child 316 in the image 320 and the image 360, respectively. It should be appreciated that as the complexity of the detection of the object in the image 360 is significantly reduced by utilizing the epipolar constraints (by determining search ranges along epipolar lines instead of scanning the entire image 360), and accordingly, the complexity in disparity calculation for the object between the images 320 and 360 is also reduced. In some examples, an object may have a same disparity for various object points whereas in some example, the various objects points (or regions) of the object may have different disparities between the images 320 and 360.

FIG. 4 is an example representation of segmentation of an object from an image of the stereoscopic pair of images, for example, the images 320 and 360, in accordance with an example embodiment. In an example embodiment, the one or more objects in at least one of the image 320 and the image 360 are segmented based on at least one disparity value associated with object points of the object. For instance, face of the child 316 in the image 360 may be segmented from the image 360 based on the disparity values (for example, d1, d2, d3 and d4) associated with object points (or pixel points) of the face of the child 316. In an example embodiment, for segmenting an object (for example, the child 316), the apparatus 200 is caused to assign an object label to the face of the child 316 (for example, assigning a same object label to the object points of the face or the child 316) and assign a non-object label to the remaining portion of the image 360. In an example embodiment, the apparatus 200 is further caused to segment a portion of the image 360 corresponding to the assigned object label (for example, the child 316) using suitable techniques such as graph cut method.

In an example embodiment, the apparatus 200 is caused to determine a first disparity and a second disparity corresponding to object points of the object. Without loss of generality, in an example embodiment, the first disparity may be a minimum disparity ($d_{min}$) that the object may have for any object point in the object, and the second disparity may be a maximum disparity ($d_{max}$) that the object may have for any object point in the object. In an example, the apparatus 200 determines the maximum disparity $d_{max}$ associated with the face of the child 316 as d3 and the minimum disparity $d_{min}$ associated with the face of the child as d2. In this example, the maximum disparity d3 and the minimum disparity d2 determine the range of disparities associated with the face of the child 316 between the image 320 and the image 360.

In an example embodiment, object points associated with the object (for example, the face of the child 316) are assigned the object label (L1) based on object cost functions calculated for different disparity values between the images, such as the image 320 and the image 360. For instance, the apparatus 200 is caused to calculate object cost functions for different disparity values lying in a disparity range between the first disparity ($d_{min}$) and the second disparity ($d_{max}$) between the image 320 and the image 360. The apparatus 200 is caused to select a disparity from the disparity range as the object label, for which the object cost function is the lowest (from among the object cost functions) between the images 320 and 360. In an example embodiment, object cost functions associated with different disparity values C(x,y,d) is calculated where d varies between $d_{min}$ and $d_{max}$. In an example embodiment, the apparatus 200 is caused to select the object cost function that is the lowest among the object cost functions calculated for various disparity values, for example, object cost function C(x,y,L1)=min C(x,y,d), where d varies between $d_{min}$ and $d_{max}$. In this example, as for a disparity L1 (for d=L1), the object cost function between the images 320 and 360 is the lowest, the disparity L1 is selected as the object label for the object such as the face of the child 316.

In an example embodiment, the apparatus 200 is caused to assign a non-object label (L2) to non-object points (for example, remaining pixel points other than the object (for example, the face of the child 316)) based on non-object cost functions between the images 320 and 360. For instance, the apparatus 200 is caused to calculate the non-object cost functions for different disparity values lying in the disparity range outside of the first disparity and the second disparity. For example, the non-object cost functions may be calculated for the disparity range (0, $d_{min}-\Delta$) or ($d_{max}+\Delta$, M) between the image 320 and the image 360, where M is maximum disparity in the scene and $\Delta$ is a unit/step size of the disparity. The apparatus 200 is caused to select a disparity value from the disparity range ((0, $d_{min}-\Delta$) and ($d_{max}+\Delta$, M)) as the non-object label, for which the non-object cost function is the lowest between the images 320 and 360. In an example embodiment, non-object cost function associated with different disparity values C(x,y,d) is calculated where d varies in the range of (0, $d_{min}-\Delta$) and ($d_{max}+\Delta$, M). In an example embodiment, the apparatus 200 is caused to select a non-object cost function that is the lowest among the non-object cost functions calculated for various disparity values, for example, non-object cost function C(x,y,L2)=min C(x,y,d) where d varies in the range of (0, $d_{min}-\Delta$) and ($d_{max}+\Delta$, M). In this example, as for a disparity L2 (for d=L2), the non-object cost function between the images 320 and 360 is the lowest, the disparity L2 is selected as the non-object label for the image regions other than the face of the child 316 in the images 320 or 360.

In an example embodiment, for a disparity value, the object cost functions and the non-object cost functions are calculated based on matching the images 320 and 360 to determine a degree of consistency of one or more image parameters between the images 320 and 360, where pixels of one of the images 320 and 360 are shifted by the disparity value. For example, for a disparity value 'd', each pixel of the image 360 is shifted in a direction by the disparity 'd', and the shifted image 360 is matched with the image 320 to determine the degree of consistency of a parameter (for example, color) between the shifted image 360 and the image 320. In an example embodiment, the object or non-object cost functions are calculated based on the determined degree of consistency for various disparity values. In an example implementation, the object and/or non-object cost functions decrease with the increase in the degree of consistency between the shifted image 360 and the image 320. In an example embodiment, disparity values (L1, L2, respectively) for which the object and non-object cost functions are the lowest, are selected as the object label (for example, the disparity L1) and the non-object label (for example, the disparity L2), respectively.

In an example embodiment, the object is segmented from the image, such as the image 360 based on applying a graph cut algorithm based on the object label (L1) and the non-object label (L2). For instance, in an example, the object points that are assigned the object label (L1) represent the face of the child 316 and the object points that are assigned the non-object label (L2) represent regions other than the face of the child 316 in the scene. In an example embodiment, the face of the child 316 may be considered as a foreground and the regions other than the face of the child 316 may be considered as a background. In an example embodiment, the regions representing the face of the child 316 (for example, assigned with the label L1) may be segmented using graph cut algorithm from the background represented by the label L2. As shown in FIG. 4, the face of the child 316 (shown by 402) is segmented from the background 404 in the image 400 (an example of the image 320 or 360).

Figure 5:
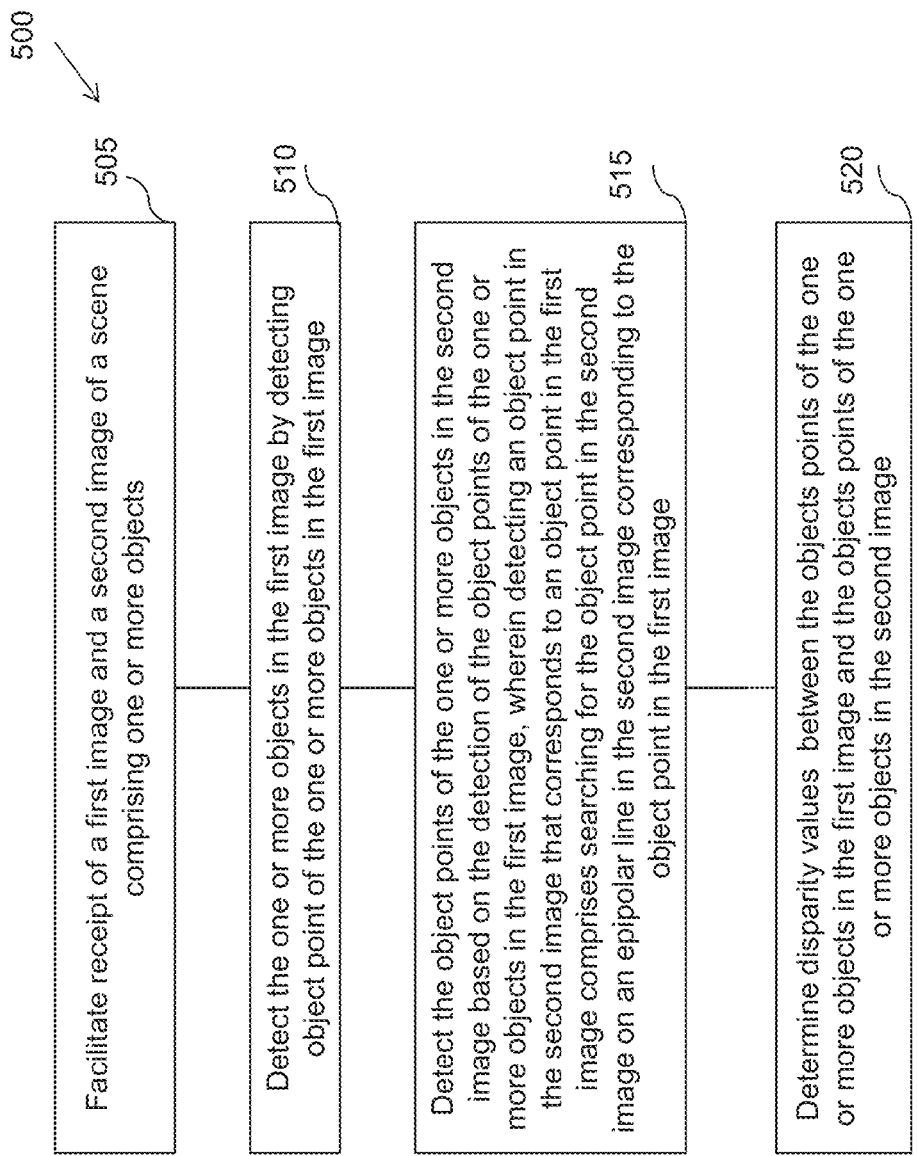
FIG. 5 is a flowchart depicting an example method, in accordance with an example embodiment.

FIG. 5 is a flowchart depicting example method 500 for detecting an object, in accordance with an example embodiment. In an example embodiment, the method 500 includes detecting objects in images of a scene and determining disparity of the object in the images, where the images of the scene are captured such that there in a disparity in at least one object of the scene between the images. The method 500 depicted in the flow chart may be executed by, for example, the apparatus 200 of FIG. 2.

At block 505, the method 500 includes facilitating receipt of images such as a first image and a second image of the scene. As described in reference to FIG. 2, the first image (I1) and the second image (I2) may be received from a media capturing device including two sensors and related components, or from external sources such as DVD, Compact Disk (CD), flash drive, memory card, or received from external storage locations through Internet, Bluetooth®, and the like. In an example embodiment, the first image (I1) and the second image (I2) comprise two different views of the scene. Examples of the images I1 and I2 may be the images 310 and 350, respectively that are shown and explained with reference to FIG. 3.

At block 510, the method 500 includes detecting one or more objects in the first image I1. For instance, the first image I1 may include three objects A, B, C and the first image I1 is scanned to determine objects A, B, C and their respective locations in the first image I1. As explained with reference to FIG. 3, the first image I1 is scanned by suitable object detection techniques to detect object points of the objects A, B and C. At block 515, the method 500 includes detecting the objects points of the one or more objects in the second image (I2) based on the detection of the object points of the one or more objects in the first image (I1). For instance, for every object detected in the image I1, a corresponding object is detected in the image I2 using the epipolar constraints. In an example embodiment, detecting an object point in the image I2 that corresponds to an object point in the image I1 comprises searching for the object point in the image I2 on an epipolar line in the image I2, where the epipolar line in the image I2 is a corresponding epipolar line for the object point of the image I1. For instance, every object point in the image I1 corresponds to an epipolar line in the image I2. In an example, for searching a corresponding object point of image I1 in the image I2, instead of searching entire image I2, the search is confined along the epipolar line in the image I2 corresponding to the object point of the image I1. As described in reference to FIG. 2, object points associated with the object are detected in the image I2 by performing horizontal scans along the epipolar lines in the image I2 corresponding to the object points of the image I1. In an example embodiment, locations of the object points corresponding to various objects detected in the image I2 are determined.

At block 520, the method 500 includes determining disparity values between objects points of the objects in the image I1 and the object points of the objects in the image I2. For instance, an object C may have one or more disparity values corresponding to one or more regions (also referred to as 'object points') of the object C between the images I1 and I2. For example, object C comprises regions (R1, R2, R3 and R4), and the regions (R1, R2, R3 and R4) may have different disparity between the images I1 and I2. In an example, different regions of a face may have different disparity values between the images I1 and I2, for example, the nose tip may have a larger disparity than the ear of the face. However, in various scenarios, an object may have a uniform disparity for its object points between the images I1 and I2.

Figure 6:
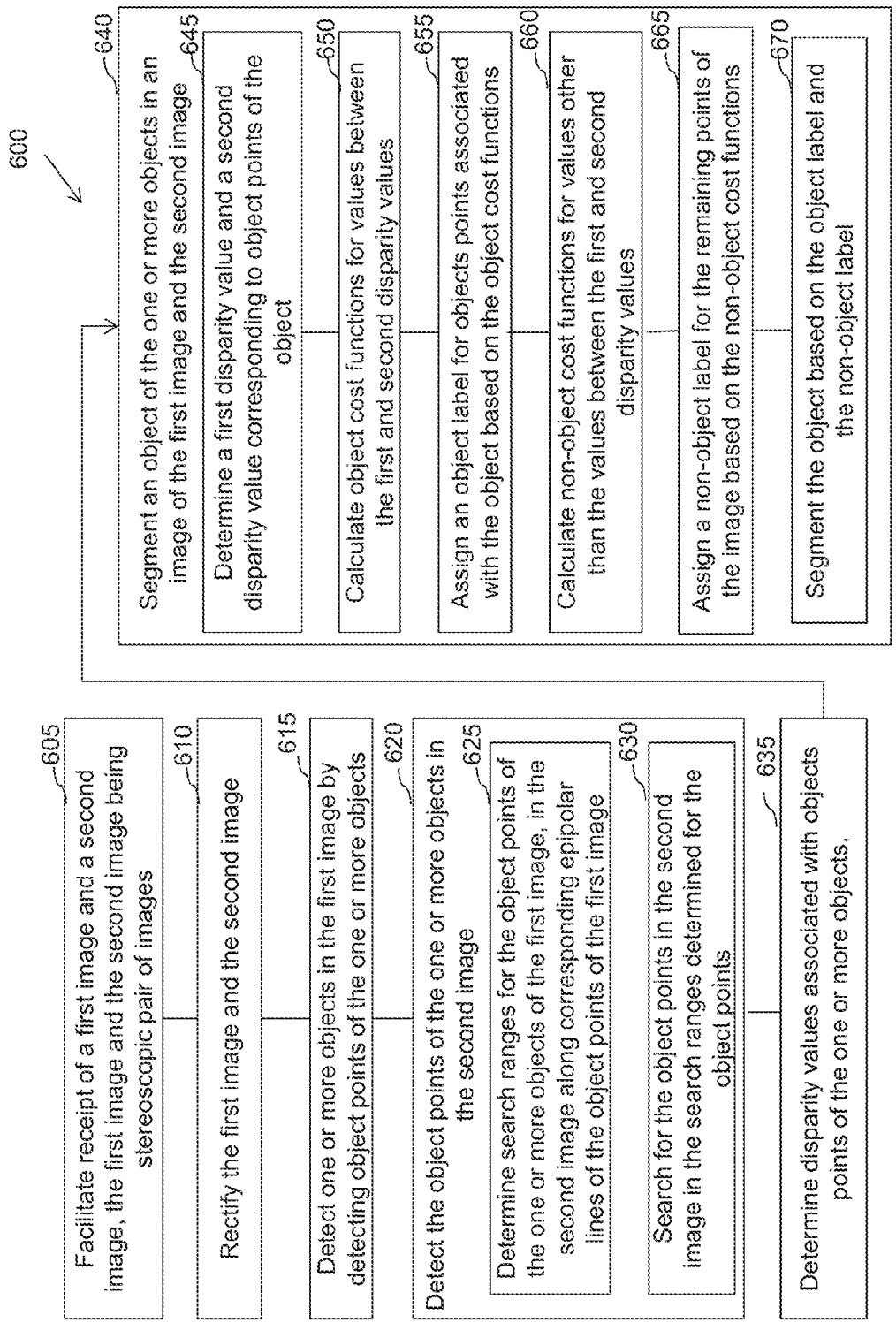
FIG. 6 is a flowchart depicting an example method for object detection and segmentation, in accordance with another example embodiment.

FIG. 6 is a flowchart depicting an example method 600, in accordance with another example embodiment. The method 600 depicted in the flow chart may be executed by, for example, the apparatus 200 of FIG. 2. In various examples, the method 600 includes providing computationally effective object detection is images of a scene, calculation of disparity values (and depth) of objects in the images and segmentation of objects in the images. The example embodiment of the method 600 is explained with the help of stereoscopic images, but it should be noted that the various operations described in the method 600 may be performed at any two or more images of a scene captured by a multi-baseline camera, an array camera, a plenoptic camera and a light field camera.

At block 605, the method 600 includes facilitating receipt of a pair of stereoscopic images such as a first image and a second image. The first image (I1) and the second image (I2) may be captured by a stereo camera. The images I1 and I2 may also be captured by a multi-baseline camera, an array camera, a plenoptic camera or a light-field camera; and examples of these images I1 and I2 may be the images 310 and 350, respectively, as shown in FIG. 3.

In certain cases, the images I1 and I2, as received by the apparatus 200 or otherwise captured by the sensors may not be rectified images with respect to each other. In such cases, the method 600 (at block 610) includes rectifying the image I1 and the image I2 such that rows in the images I1 and I2 correspond to each other. In so much, if the images I1 and I2 as received at the apparatus 200 are rectified images, the operation of rectification (at block 610) is not required.

At block 615, the method 600 includes detecting one or more objects in the image I1 by detecting object points of the one or more objects in the image I1. For instance, the image I1 includes three objects A, B, C and the image I1 is scanned to determine object points of the objects A, B and C and their respective locations in the image I1. At block 620, the method 600 includes detecting the object points of the one or more objects in the image I2 based on the detection of the object points of the one or more objects in the image I1. It should be noted that the object points are not searched on each pixel point in the image I2; instead, the object points are searched in the image I2 in limited search ranges on epipolar lines corresponding to the object points, where the search ranges are determined based on the locations of object points of the already detected objects A, B and C in the image I1. The operation of the block 620 may be executed by the operations performed by blocks 625 and 630.

At block 625, the method 600 includes determining search ranges, for the object points of the one or more objects of the image I1, in the image I2 along corresponding epipolar lines of the object points in the image I2. In an example embodiment, search ranges for the object points of the objects may be determined based on the sizes and distances of the objects from the camera. For instance, objects A, B and C detected in the image I1 have sizes H1, H2 and H3, respectively. In an example, it is determined that the object A associated with the size H1 is the largest, followed by the object C associated with size H3, and the object B associated with size H2 is the smallest. In this example, the search range in the second image I2 decreases with decrease in the sizes of the objects detected in the image I1. For instance, if the search range associated with the object A is S1, the search range for the object C associated with size H3 is less than the search range S1 (search range for C is S2, such that S2<S1), and the search range for the object B associated with size H2 is the smallest.

At 630, the method 600 includes searching for the object points in the second image I2 in the search ranges determined for the object points. For example, a search range in the image I2 for the object points of the object A of the image I1 is determined along epipolar lines in the image I2 corresponding to the object points of the object A of the image I1; and the object points of the object A are searched in the determined search range.

At block 635, the method 600 includes determining disparity values between the object points of the one or more objects in the image I1 and the object points of the one or more objects in the image I2. For instance, an object C may have one or more disparity values corresponding to one or more regions (also referred to as 'object points') of the object C between the images I1 and I2. For example, object C comprises regions (R1, R2, R3 and R4), and the regions (R1, R2, R3 and R4) may have different disparity between the images I1 and I2. In an example embodiment, an object may have a same disparity. In an example embodiment, disparity value for an object between the image I1 and the image I2 is determined based on a location of the object in the image I1 and a location of the object in the image I2.

At block 640, the method 600 includes segmenting an object of the one or more objects in at least one of the image I1 and the image I2 based on the disparity value associated with the object between the images I1 and I2. For instance, object C may be segmented from the image I2 based on the disparity values associated with the object C between the images I1 and I2. In an example embodiment, the operation of the block 640 is performed by the blocks 645-670.

At block 645, the method 600 includes determining a first disparity (for example, $d_{min}$) and a second disparity ($d_{max}$) corresponding to object points of the object C. For instance, object C spans different disparity values associated with different regions such as (R1, R2, R3 and R4) between the images I1 and I2. In an embodiment, the first disparity value ($d_{min}$) and the second disparity value ($d_{max}$) associated with the object C are computed that determine the range of disparity values ($d_{min}$, $d_{max}$) spanned by the object points of the object C. In an example embodiment, values of the $d_{min}$, $d_{max}$ may be calibrated as a function of particular stereo camera setup such as a baseline, focal length, the face size and a disparity of the object.

At block 650, the method 600 includes calculating object cost functions between the images I1 and I2 for a plurality of disparity values lying between the first disparity value and the second disparity value, for example in the range ($d_{min}$, $d_{max}$). At block 655, the method 600 includes assigning an object label (L1) for objects points associated with the object C based on object cost functions between the first image I1 and the second image I2. At block 655, a disparity value is selected from among the range ($d_{min}$, $d_{max}$) as the object label, for which the object cost function is the lowest between the images I1 and I2. Some example embodiments of the calculation of the object cost functions are described in reference to FIG. 4.

At block 660, the method 600 includes calculating non-object cost functions between the images I1 and I2 for one or more disparity values lying in a range outside of the first disparity value and the second disparity value, for example in the range (0, $d_{min}-\Delta$) or ($d_{max}+\Delta$, M), where M is maximum disparity in the scene and $\Delta$ is a unit/step size of the disparity, At block 665, the method 600 includes assigning a non-object label (L2) to non-object points (for example, remaining pixel points other than the object C) based on the non-object cost functions between the images I1 and I2. In an example embodiment, a disparity value is selected among the different disparity values (from (0, $d_{min}-\Delta$) and ($d_{max}+\Delta$, M)) as the non-object label, for which the non-object cost function is the lowest between the images I1 and I2.

At block 670, the method 600 includes segmenting the object based on the object label and the non-object label. In an example embodiment, the method 600 includes segmenting the object based on applying a graph cut algorithm on the object label L1 and the non-object label L2. For instance, the graph cut algorithm is used to segment object points that are assigned with the object label L1 from the background (that is assigned the non-object label L2). Accordingly, the object C may be segmented from the image I1 or I2.

It should be noted that to facilitate discussions of the flowcharts of FIGS. 5 and 6, certain operations are described herein as constituting distinct steps performed in a certain order. Such implementations are examples only and are non-limiting in scope. Certain operation may be grouped together and performed in a single operation, and certain operations can be performed in an order that differs from the order employed in the examples set forth herein. Moreover, certain operations of the methods 500 and 600 are performed in an automated fashion. These operations involve substantially no interaction with the user. Other operations of the methods 500 and 600 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to detect objects in images (for example, in stereoscopic images) of a scene, where there is a disparity between the objects in the images. Various embodiments provide techniques for reducing the complexity of object detection in the stereoscopic images. For instance, the objects are detected in only one image of the stereoscopic images, and the other image is not entirely scanned for the detection of objects, instead the search is performed in search ranges determined based on the epipolar constraints of the objects. As the detection of the objects in the other image is computationally efficient, the disparity associated with the objects in the stereoscopic images is also determined efficiently. Further, various embodiments offer segmentation of the object from the images based on disparity values associated with the object using graph cuts that is a fast and accurate segmentation process.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   facilitating receipt of a first image and a second image of a scene comprising one or more objects;
   detecting the one or more objects in the first image, wherein detecting the one or more objects comprises detecting object points of the one or more objects in the first image;
   detecting object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image;
   determining disparity values between the object points of the one or more objects in the first image and the object points of the one or more objects in the second image, wherein a disparity value between the object point in the first image and the object point in the second image is determined based at least on a detected position of the object point in the first image and a detected position of the object point in the second image; and
   segmenting an object of the one or more objects in at least one of the first image and the second image comprises:
   determining a first disparity value and a second disparity value corresponding to the object points of the object;
   calculating object cost functions between the first image and the second image for a plurality of disparity values lying between the first disparity value and the second disparity value;
   assigning an object label for the object points of the object in an image based on the object cost functions;
   calculating non-object cost functions between the first image and the second image for one or more disparity values other than the plurality of disparity values lying between the first disparity value and the second disparity value;
   assigning a non-object label for points other than the object points of the object in the image based on the non-object cost functions between the first image and the second image; and
   segmenting the object in the image based on the object label and the non-object label.

2. The method as claimed in claim 1, wherein detecting the object points of the one or more objects in the second image comprises:
   determining search ranges for the object points of the first image in the second image along epipolar lines of the object points of the first image, wherein a search range for an object point of a first object of the one or more objects is more than a search range for an object point of a second object of the one or more objects, in an instance the first object is greater in size than the second object; and
   searching for the object points in the second image in the search ranges determined for the object points of the first image.

3. The method as claimed in claim 1, wherein the disparity value between the object point in the first image and the object point in the second image is a difference of the detected position of the object point in the first image and the detected position of the object point in the second image.

4. The method as claimed in claim 1, wherein a disparity value for which a object cost function is the lowest from among the object cost functions is assigned as the object label, and a disparity value for which a non-object cost function is the lowest from among the non-object cost functions is assigned as the non-object label.

5. The method as claimed in claim 1, wherein calculating a object cost function between the first image and the second image for a disparity value of the plurality of disparity values comprises determining a degree of consistency of one or more image parameters between the first image and the second image if pixels of one of the first image and the second image are shifted by the disparity value.

6. The method as claimed in claim 1, wherein the first image and the second image are a pair of stereoscopic images.

7. The method as claimed in claim 1, further comprising assigning an object label to the segmented object and assign a non-object label to regions other than the segmented object.

8. An apparatus comprising:
   at least one processor; and
   at least one memory comprising computer program code, the at least one memory and the computer program code configured to, with the at least one processor, cause the apparatus to at least perform:
   facilitate receipt of a first image and a second image of a scene comprising one or more objects;
   detect the one or more objects in the first image, wherein detecting the one or more objects comprises detecting object points of the one or more objects in the first image;
   detect object points of the one or more objects in the second image based on the detection of the object points of the one or more objects in the first image, wherein detecting an object point in the second image that corresponds to an object point in the first image comprises searching for the object point in the second image on an epipolar line in the second image corresponding to the object point in the first image;
   determine disparity values between the object points of the one or more objects in the first image and the object points of the one or more objects in the second image, wherein a disparity value between the object point in the first image and the object point in the second image is determined based at least on a detected position of the object point in the first image and a detected position of the object point in the second image and
   segment an object of the one or more objects in at least one of the first image and the second image, the apparatus is further caused, at least in part to:
   determine a first disparity value and a second disparity value corresponding to object points of the object;
   calculate object cost functions between the first image and the second image for a plurality of disparity values lying between the first disparity value and the second disparity value;
   assign an object label for the object points of the object in an image based on the object cost functions;
   calculate non-object cost functions between the first image and the second image for one or more disparity values other than the plurality of disparity values lying between the first disparity value and the second disparity value;
   assign a non-object label for points other than the object points of the object in the image based on the non-object cost functions between the first image and the second image; and
   segment the object in the image based on the object label and the non-object label.

9. The apparatus as claimed in claim 8, wherein to detect the object points of the one or more objects in the second image, the apparatus is further caused, at least in part to:
   determine search ranges for the object points of the first image in the second image along epipolar lines of the object points of the first image, wherein a search range for an object point of a first object of the one or more objects is more than a search range for an object point of a second object of the one or more objects, if the first object is greater in size than the second object; and
   search for the object points in the second image in the search ranges determined for the object points of the first image.

10. The apparatus as claimed in claim 8, wherein the disparity value between the object point in the first image and the object point in the second image is a difference of the detected position of the object point in the first image and the detected position of the object point in the second image.

11. The apparatus as claimed in claim 8, wherein a disparity value for which the object cost function is the lowest from among the object cost functions is assigned as the object label, and a disparity value for which a non-object cost function is the lowest from among the non-object cost functions is assigned as the non-object label.

12. The apparatus as claimed in claim 8, wherein to calculate the object cost function between the first image and the second image for a disparity value of the plurality of disparity values comprises determining a degree of consistency of one more image parameters between the first image and the second image if pixels of one of the first image and the second image are shifted by the disparity value.

13. The apparatus as claimed in claim 8, wherein the first image and the second image are a pair of stereoscopic images.

14. The apparatus as claimed in claim 8, wherein the apparatus is further caused, at least in part to assign an object label to the segmented object and assign a non-object label to regions other than the segmented object.

15. A computer program product comprising at least one non-transitory computer-readable storage medium, the non-transitory computer-readable storage medium comprising a set of computer program instructions, which, when executed by one or more processors, cause an apparatus to at least perform:
   facilitate receipt of a first image and a second image of a scene comprising one or more objects;
   detect the one or more objects in the first image, wherein detecting the one or more objects comprises delecting object points of the one or more objects in the first image;
   detect object points of the one or more objects in the second image based on the detection of the object points of the one or more objects in the first image, wherein detecting an object point in the second image that corresponds to an object point in the first image comprises searching for the object point in ihe second image on an epipolar line in the second image corresponding to the object point in the first image;
   determine disparity values between the object points of the one or more objects in the first image and the object points of the one or more objects in the second image, wherein a disparity value between the object point in the first image and the object point in the second image is determined based at least on a detected position of the object point in the first image and a detected position of the object point in the second image; and
   segment an object of the one or more objects in at least one of the first image and the second image, the apparatus is further caused, at least in part to:
   determine a first disparity value and a second disparity value corresponding to object points of the object;
   calculate object cost functions between the first image and the second image for a plurality of disparity values lying between the first disparity value and the second disparity value;
   assign an object label for the object points of the object in an image based on object cost functions;

calculate non-object cost functions between the first image and the second image for one or more disparity values other than the plurality of disparity values lying between the first disparity value and the second disparity value;

assign a non-object label for points other than the object points of the object in the image based on the non-object cost functions between the first image and the second image; and segment the object in the image based on the object label and the non-object label.

16. The computer program product as claimed in claim 15, wherein for detecting the object points of the one or more objects in the second image, the apparatus is further caused, at least in part to:

determine search ranges for the object points of the first image in the second image along epipolar lines of the object points of the first image, wherein a search range for an object point of a first object of the one or more objects is more than a search range for an object point of a second object of the one or more objects, if the first object is greater in size than the second object; and search for the object points in the second image in the search ranges determined for the object points of the first image.

17. The computer program product as claimed in claim 15, wherein the first image and the second image are rectified images.

18. The computer program product as claimed in claim 15, wherein the disparity value between the object point in the first image and the object point in the second image is a difference of the detected position of the object point in the first image and the detected position of the object point in the second image.

* * * * *

UNITED STATES PATENT AND TRADEMARK OFFICE
CERTIFICATE OF CORRECTION

| | |
|---|---|
| PATENT NO. | : 9,443,130 B2 |
| APPLICATION NO. | : 14/333857 |
| DATED | : September 13, 2016 |
| INVENTOR(S) | : Ukil et al. |

It is certified that error appears in the above-identified patent and that said Letters Patent is hereby corrected as shown below:

In the Claims

Column 24,
Line 38, "delecting" should read --detecting--;
Line 46, "ihe second" should read --the second--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*